(12) United States Patent
Wang et al.

(10) Patent No.: US 8,948,329 B2
(45) Date of Patent: Feb. 3, 2015

(54) APPARATUS AND METHODS FOR TIMING RECOVERY IN A WIRELESS TRANSCEIVER

(75) Inventors: Michael Mao Wang, San Diego, CA (US); Bojan Vrcelj, San Diego, CA (US); Fuyun Ling, San Diego, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1214 days.

(21) Appl. No.: 11/303,589

(22) Filed: Dec. 15, 2005

(65) Prior Publication Data

US 2007/0140322 A1    Jun. 21, 2007

(51) Int. Cl.
*H04L 7/00* (2006.01)
*H04L 27/00* (2006.01)
*H04L 27/26* (2006.01)

(52) U.S. Cl.
CPC .......... *H04L 27/2656* (2013.01); *H04L 27/261* (2013.01)
USPC .......................................... 375/355; 375/324

(58) Field of Classification Search
USPC ................................................. 375/355, 224
See application file for complete search history.

(56) References Cited

U.S. PATENT DOCUMENTS

| | | | |
|---|---|---|---|
| 4,739,510 A | | 4/1988 | Jeffers et al. |
| 5,170,413 A | | 12/1992 | Hess et al. |
| 5,323,422 A | | 6/1994 | Ushirokawa |
| 5,490,168 A | * | 2/1996 | Phillips et al. ............... 375/224 |
| 5,555,247 A | | 9/1996 | Matsuoka et al. |
| 5,732,113 A | | 3/1998 | Schmidl et al. |
| 5,848,107 A | | 12/1998 | Philips |
| 6,175,551 B1 | | 1/2001 | Awater et al. |
| 6,209,109 B1 | * | 3/2001 | Hori et al. ..................... 714/707 |
| 6,347,071 B1 | * | 2/2002 | Cupo et al. ................... 370/203 |
| 6,498,928 B1 | | 12/2002 | Hiramatsu |
| 6,546,062 B1 | | 4/2003 | Du et al. |
| 6,614,864 B1 | | 9/2003 | Raphaeli et al. |
| 6,628,946 B1 | | 9/2003 | Wiberg et al. |

(Continued)

FOREIGN PATENT DOCUMENTS

| | | |
|---|---|---|
| CN | 1339878 A | 3/2002 |
| CN | 1371576 | 9/2002 |

(Continued)

OTHER PUBLICATIONS

Timing Recovery for OFDM Transmission Baoguo Yang, Member, IEEE, Khaled Ben Letaief, Roger S. Cheng, Member, IEEE, and Zhigang Cao, Senior Member, IEEE.*

(Continued)

*Primary Examiner* — Tanmay Shah
(74) *Attorney, Agent, or Firm* — Fulbright & Jaworski LLP

(57) ABSTRACT

Apparatus and methods for use in a wireless communication system are disclosed for recovery of timing tracking in a device, such as a wireless transceiver, after decoding errors occur due to incorrect timing tracking. In particular, the disclosed methods and apparatus recover timing tracking by monitoring a decoded signal in the transceiver for decoding errors occurring during a first frame, determining whether a number of decoding errors is greater than a predetermined amount, reacquiring a first pilot channel at a start of a subsequently received second frame when the number of decoding errors is determined to be greater than the predetermined amount, and resetting timing tracking of the transceiver based on the reacquired first pilot channel.

26 Claims, 5 Drawing Sheets

(56) References Cited

U.S. PATENT DOCUMENTS

| | | | |
|---|---|---|---|
| 6,650,616 B2 | 11/2003 | Crawford | |
| 6,724,834 B2 | 4/2004 | Garrett et al. | |
| 6,731,594 B1 | 5/2004 | Bohnke | |
| 6,778,591 B2 | 8/2004 | Sato | |
| 6,795,435 B1 | 9/2004 | Jouppi et al. | |
| 6,839,339 B1 | 1/2005 | Chuah | |
| 6,885,712 B1 | 4/2005 | Celebi | |
| 6,993,083 B1 | 1/2006 | Shirakata et al. | |
| 7,027,540 B2 | 4/2006 | Wilson et al. | |
| 7,058,144 B2 | 6/2006 | Baldwin | |
| 7,110,387 B1 | 9/2006 | Kim et al. | |
| 7,123,669 B2 | 10/2006 | Ye et al. | |
| 7,133,457 B2 | 11/2006 | Singh et al. | |
| 7,177,376 B2 | 2/2007 | Atungsiri et al. | |
| 7,177,378 B2 | 2/2007 | Baldemair et al. | |
| 7,203,894 B2 | 4/2007 | Pan et al. | |
| 7,236,554 B2 | 6/2007 | Gupta | |
| 7,254,196 B2 | 8/2007 | Kriedte et al. | |
| 7,278,071 B2 | 10/2007 | Budde et al. | |
| 7,372,889 B2* | 5/2008 | Atarashi et al. | 375/130 |
| 7,391,828 B2 | 6/2008 | Liu et al. | |
| 7,411,983 B2 | 8/2008 | Jo et al. | |
| 7,492,700 B2 | 2/2009 | Schmidt | |
| 7,577,087 B2 | 8/2009 | Palin | |
| 7,623,607 B2 | 11/2009 | Vrcelj et al. | |
| 2002/0021700 A1 | 2/2002 | Hata et al. | |
| 2002/0024991 A1 | 2/2002 | Levin et al. | |
| 2002/0080737 A1 | 6/2002 | Koo et al. | |
| 2002/0110202 A1 | 8/2002 | Wilson et al. | |
| 2002/0126220 A1 | 9/2002 | Wilson et al. | |
| 2003/0016773 A1 | 1/2003 | Atungsiri et al. | |
| 2003/0026197 A1 | 2/2003 | Crawford | |
| 2003/0043927 A1 | 3/2003 | Suzuki | |
| 2003/0058962 A1 | 3/2003 | Baldwin | |
| 2003/0095611 A1 | 5/2003 | Budde et al. | |
| 2003/0161323 A1 | 8/2003 | Harada et al. | |
| 2003/0193914 A1* | 10/2003 | Lomp et al. | 370/335 |
| 2003/0218973 A1 | 11/2003 | Oprea et al. | |
| 2004/0022273 A1* | 2/2004 | Jo et al. | 370/503 |
| 2004/0100939 A1 | 5/2004 | Kriedte et al. | |
| 2004/0120436 A1 | 6/2004 | Qiu | |
| 2004/0125742 A1 | 7/2004 | Schmidt | |
| 2004/0146024 A1 | 7/2004 | Li et al. | |
| 2004/0198371 A1 | 10/2004 | Balasubramanian et al. | |
| 2004/0243903 A1* | 12/2004 | Pan et al. | 714/746 |
| 2004/0258092 A1 | 12/2004 | Sugaya | |
| 2005/0041681 A1 | 2/2005 | Lee et al. | |
| 2005/0063298 A1 | 3/2005 | Ling et al. | |
| 2005/0163258 A1 | 7/2005 | Gore et al. | |
| 2005/0180533 A1 | 8/2005 | Hamman | |
| 2005/0207365 A1 | 9/2005 | Balachandran et al. | |
| 2005/0249181 A1 | 11/2005 | Vijayan et al. | |
| 2006/0018413 A1 | 1/2006 | Gupta | |
| 2006/0088111 A1* | 4/2006 | Ye et al. | 375/260 |
| 2006/0114815 A1 | 6/2006 | Hasegawa et al. | |
| 2006/0141933 A1 | 6/2006 | Smee et al. | |
| 2006/0205356 A1 | 9/2006 | Laroia et al. | |
| 2006/0215539 A1 | 9/2006 | Vrcelj et al. | |
| 2006/0218596 A1 | 9/2006 | Chandhok et al. | |
| 2006/0221810 A1 | 10/2006 | Vrcelj et al. | |
| 2006/0233097 A1 | 10/2006 | Vrcelj et al. | |
| 2006/0233269 A1 | 10/2006 | Bhushan et al. | |
| 2006/0245349 A1 | 11/2006 | Vrcelj et al. | |
| 2006/0251028 A1 | 11/2006 | Nagata et al. | |
| 2007/0053473 A1 | 3/2007 | Palin | |
| 2007/0098125 A1 | 5/2007 | Vrcelj et al. | |
| 2007/0140322 A1 | 6/2007 | Wang et al. | |
| 2007/0211765 A1 | 9/2007 | Vrcelj et al. | |
| 2008/0260008 A1 | 10/2008 | Vrcelj et al. | |
| 2010/0034242 A1 | 2/2010 | Vrcelj et al. | |
| 2010/0157833 A1 | 6/2010 | Vrcelj et al. | |
| 2010/0246564 A1 | 9/2010 | Vrcelj et al. | |

FOREIGN PATENT DOCUMENTS

| | | |
|---|---|---|
| CN | 1448015 A | 10/2003 |
| CN | 101187847 A | 5/2008 |
| CN | 101310555 A | 11/2008 |
| CN | 101316160 A | 12/2008 |
| EP | 0915597 A1 | 5/1999 |
| EP | 0999671 A2 | 5/2000 |
| EP | 1178642 A2 | 2/2002 |
| EP | 1180870 A2 | 2/2002 |
| EP | 1320208 A2 | 6/2003 |
| EP | 1416693 A2 | 5/2004 |
| EP | 1439668 A2 | 7/2004 |
| GB | 2365714 A | 2/2002 |
| GB | 2395094 A | 5/2004 |
| JP | 10135926 A | 5/1998 |
| JP | 10224318 A | 8/1998 |
| JP | 11194943 A | 7/1999 |
| JP | 2001069119 A | 3/2001 |
| JP | 2001119368 A | 4/2001 |
| JP | 2001251273 A | 9/2001 |
| JP | 2002044548 A | 2/2002 |
| JP | 2002171238 | 6/2002 |
| JP | 2003510952 T | 3/2003 |
| JP | 2003110519 A | 4/2003 |
| JP | 2003518826 T | 6/2003 |
| JP | 2004153831 | 5/2004 |
| JP | 2004282730 A | 10/2004 |
| JP | 2004304214 A | 10/2004 |
| JP | 2004343732 | 12/2004 |
| JP | 2005027167 | 1/2005 |
| JP | 2005039764 A | 2/2005 |
| JP | 2005057575 A | 3/2005 |
| JP | 2005057673 | 3/2005 |
| JP | 2005527154 | 9/2005 |
| KR | 1020050010834 | 1/2005 |
| RU | 2235429 C1 | 8/2004 |
| TW | 400675 B | 8/2000 |
| TW | 451572 B | 8/2001 |
| TW | 543329 B | 7/2003 |
| TW | 560153 B | 11/2003 |
| TW | 571543 B | 1/2004 |
| TW | 577202 B | 2/2004 |
| TW | 200705911 | 2/2007 |
| TW | 321809 Y | 11/2007 |
| WO | WO9707620 | 2/1997 |
| WO | WO0049782 | 8/2000 |
| WO | WO0072609 | 11/2000 |
| WO | WO0077961 | 12/2000 |
| WO | WO0147204 A1 | 6/2001 |
| WO | WO 0233838 A2 * | 4/2002 |
| WO | WO03096717 A1 | 11/2003 |
| WO | WO2005002164 A1 | 1/2005 |
| WO | WO2005022797 | 3/2005 |
| WO | WO2005050865 | 6/2005 |
| WO | WO 2006/099241 A1 | 9/2006 |
| WO | WO2006099240 | 9/2006 |
| WO | WO2006099343 A1 | 9/2006 |
| WO | WO2006105177 A2 | 10/2006 |

OTHER PUBLICATIONS

International Search Report and Written Opinion—PCT/US06/062129, International Searching Authority—European Patent Office, Feb. 25, 2008.

Khan, "Low-complexity ML channel estimation schemes for OFDM," 2005 13th IEEE International Conference on Networks, 2005. Jointly held with the 2005 IEEE 7th Malaysia International Conference on Communication, vol. 2, 16018 Nov. 2005, pp. 607-612.

Yamazaki, et al: "A Timing Synchronization Scheme for OFDM," Technical Report of the Institute of Electronics, Information, and Communication Engineers, Jun. 21, 2002, vol. 102, No. 150, pp. 55-60, RCS 2002-84.

Zhou, et al., "Real-Time ISI free window tracking scheme for OFDM systems," Vehicular Technology Conference, 2004, VTC2004-Fall. 2004 IEEE 60th Los Angeles, CA, USA Sep. 26-29, 2004,

(56) References Cited

OTHER PUBLICATIONS

Piscataway, NJ, USA, IEEE Sep. 26, 2004, pp. 4325-4329, XP010790237.
Office Action in Japan application 2008-539148 corresponding to U.S. Appl. 12/579,131, citing JP2004343732, JP2005057673, GB2365714, US6885712 and JP2005527154 dated Apr. 28, 2011 (050236JP).
Vern Paxson, "Bro: A System for Detecting Network Intruders in Real-Time", Lawrence Berkeley National Laboratory, pp. 1-21, Jan. 26-29, 1998.
Taiwanese Search Report—095147160—TIPO—Sep. 7, 2009.

* cited by examiner

APPARATUS AND METHODS FOR TIMING RECOVERY IN A WIRELESS TRANSCEIVER

BACKGROUND

1. Field

The present disclosure relates to apparatus and methods for timing recovery in a timing tracking circuit in a wireless communication transceiver and, more particularly, to apparatus and methods for determining when a timing tracking circuit is incorrectly tracking timing of a wireless signal received by the transceiver and resetting the timing tracking circuit in order to mitigate degradation of the quality of a signal output by the transceiver.

2. Background

In certain wireless communications systems, such as those employing orthogonal frequency division multiplexing (OFDM), timing tracking of wireless communications signals is important for maintaining the quality of audio and visual signal information contained in those signals. In systems, such as OFDM, timing tracking circuits within transceivers of such systems get locked to the incorrect timing window. For example, OFDM frames typically include 1,024 chips. Thus, when the timing tracking circuit is locked to a wrong timing window or frame, the timing will be in entire 1,024 chips of the correct timing window. When this happens, the timing circuit is not able to recover and will fail to decode any packets subsequently received, which results in degradation of the radio and/or audio quality of the receiver.

It is further noted that in communications systems such as OFDM systems, frames of information are arranged into what are termed "superframes" that contain a number of smaller frames each containing a number of packets containing communications data including video and audio data. Additionally in such communications systems, each frame includes time division multiplexed (TDM) pilot channels that are used for channel estimation and also at initial acquisition of a signal to establish the timing tracking. Typically in some systems, the TDM pilot signals are channels that are only acquired at the initial acquisition of the signal and are not used subsequently for setting the timing tracking until the transceiver enters another initialization mode, such as after a transceiver has awakened from a. sleep mode. In such systems, however, when timing tracking is locked to the wrong timing window, as discussed above, the quality of the coded information is degraded.

SUMMARY

In one aspect, a method for recovery of timing of a communication signal in a transceiver is described and includes monitoring a decoded signal in the transceiver for decoding errors occurring during a first frame, and determining whether a number of decoding errors is greater than a predetermined amount. The method further includes reacquiring a first pilot channel at a start of a second received frame when the number of decoding errors is determined to be greater than the predetermined amount, and resetting timing tracking of the transceiver based on the reacquired first pilot channel.

In another aspect, a computer readable medium has instructions stored thereon where the stored instructions, when executed by a processor, cause the processor to perform a method to recover timing tracking. The method includes monitoring a decoded signal in the transceiver for decoding errors occurring during a first frame, determining whether a number of decoding errors is greater than a predetermined amount; reacquiring a first pilot channel at a start of a second received frame when the number of decoding errors is determined to be greater than the predetermined amount, and resetting timing tracking of the transceiver based on the reacquired first pilot channel.

According to yet another aspect, a transceiver apparatus is configured to recover timing tracking. In particular, the transceiver includes a decoder configured to decoder communication signals received by transceiver including at least one pilot channel. The transceiver further includes at least one processor configured to monitor a decoded signal output by the decoder for decoding errors occurring during a first frame, and to determine whether a number of decoding errors is greater than a predetermined amount. The processor is further configured to reacquire a first pilot channel at a start of a subsequently received second frame when the number of decoding errors is determined to be greater than the predetermined amount, and to reset timing tracking of the transceiver based on the reacquired first pilot channel.

According to still another aspect, an apparatus is disclosed for resolving timing in a wireless communication device. The apparatus includes means for monitoring a decoder output and determining a number of decoding errors, and means for determining whether the number of decoding errors exceeds a predetermined number. Further, the apparatus includes means for reacquiring a first pilot channel based on a determination result from the means for determining whether the number of decoding errors exceeds the predetermined number, and means for resetting timing tracking based on reacquired first pilot channel.

DETAILED DESCRIPTION

The presently disclosed methods and apparatus provide timing tracking recovery in a transceiver used in a communications system. In particular, the present disclosure teaches apparatus and methods where timing recovery is performed by requiring at least one pilot channel at predetermined intervals, such as at a beginning of a next superframe, to reset a timing tracking circuit within the transceiver. The presently disclosed methods and apparatus thus ensure quick recovery from timing errors, particularly those transceivers having limited channel estimation resolution (i.e., transceivers having channels longer than 512 chips).

Figure 1:
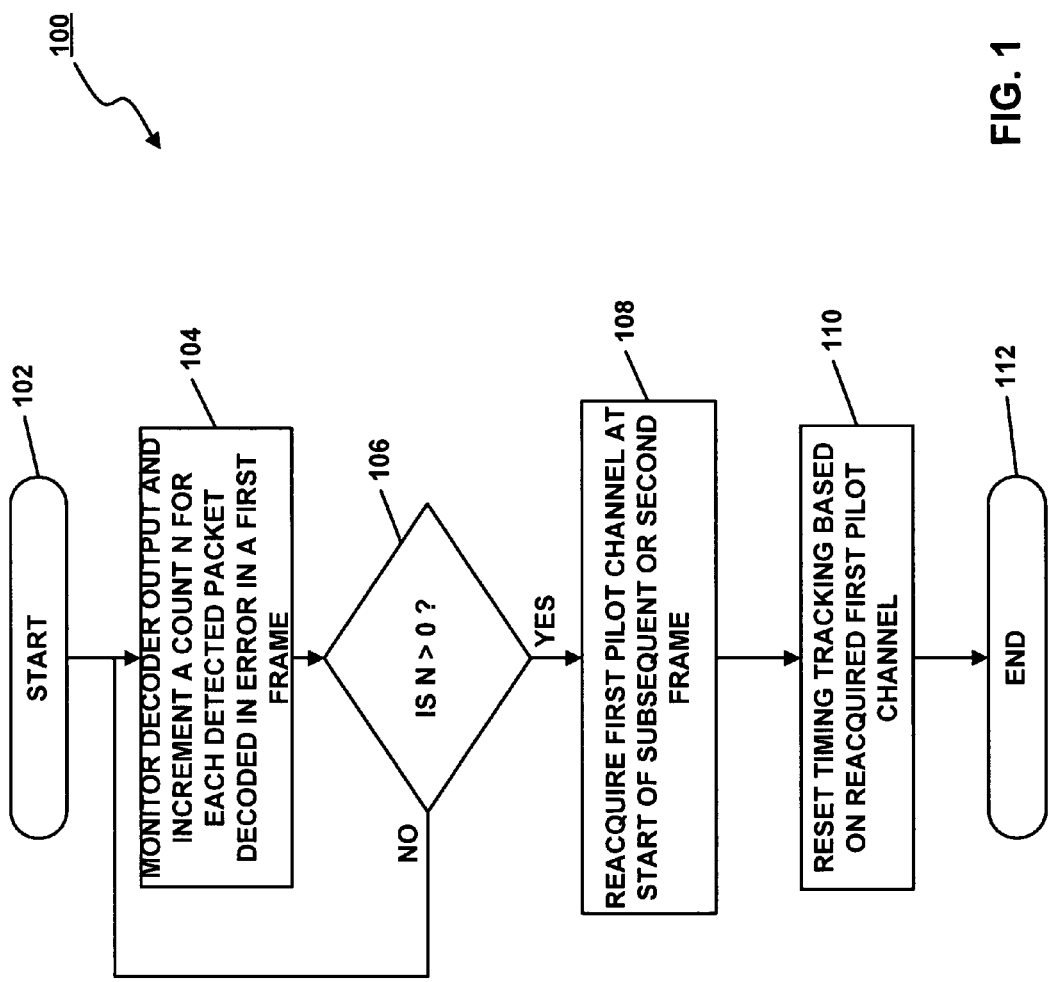
FIG. 1 is a flow diagram of an exemplary method for resetting timing tracking according to the present disclosure

FIG. 1 illustrates a method for resetting timing tracking according to an example of the present disclosure. As illustrated, the process 100 begins at a start block 102. Flow then proceeds to block 104 where a decoded signal of the transceiver is monitored for decoding errors and a count is incremented for each detected decoding error in the decoded signal during a first frame. More particularly, a decoder output, for example, is monitored and a count "N" is incremented for each frame that has been decoded in error.

Flow proceeds from block 104 to decision block 106 where a determination is made whether the count "N" is greater than a predetermined amount, which is effectively a threshold level of an acceptable or tolerated number of errors in a frame. In the example shown in FIG. 1, the predetermined amount is set at zero when no tolerance for error is acceptable. In one example, the frame may be a superframe and the count N is therefore a count of the number of errors occurring within the superframe. It is noted, however, that one of ordinary skill in the art will appreciate that the monitoring frequency may be set to count errors over a plurality of superframes, in one example, or to count the particular number of packets decoded in error over a particular time period. Furthermore, instead of a count, an error flag could simply be set anytime an error occurs during a predetermined monitoring period or during decoding of a predetermined number of frames (e.g., a superframe) when it is desired that any error should trigger a reacquisition of the pilot channel.

If the count "N" is not greater than zero as determined at block 106, flow proceeds back to block 104 where the decoder output continues to be monitored for errors. Alternatively, if the decision at block 106 is in the affirmative, flow proceeds to block 108. As illustrated in block 108, a first pilot channel of a received signal is then reacquired at the start of a subsequent or second frame.

Once the pilot channel has been reacquired as illustrated in block 108, flow proceeds to block 110 where timing tracking is reset based on the reacquired pilot channel. The process then continues to block 112 where the process is terminated. It is noted that the procedure 100 may be continually repeated while a transceiver is operable, either in active or sleep modes. Accordingly, the transceiver is continuously checked for decoding errors and timing tracking is corrected whenever errors are detected.

In certain communications systems, two or more pilot channels are used to initialize timing tracking. In systems, such as OFDM systems, for example, it is known to utilize two TDM pilot channels for initial timing tracking setting. The use of multiple pilot channels ensures greater accuracy in setting timing tracking. Accordingly, in another example two or more pilot channel may be used in order to reacquire timing tracking for a transceiver. It is noted, however, that acquisition of timing using pilot channel synchronization incurs extra power cost within a receiver. That is, the transceiver must wake up and perform processing in order to reacquire the timing tracking when it could otherwise be in sleep mode since data may not necessarily be received by the transceiver at that time. Moreover, acquiring two or more pilot channels instead of only one incurs yet a greater power cost to the transceiver. In order to balance the concern of incurring extra power (i.e., acquiring two or more pilot channel signals for reacquisition of timing) in order to ensure greater accuracy in timing synchronization against the concern of conserving power by merely acquiring one pilot channel, another exemplary method is disclosed in FIG. 2 where reacquisition of timing tracking is based on selective use of one or two pilot channels.

Figure 2:
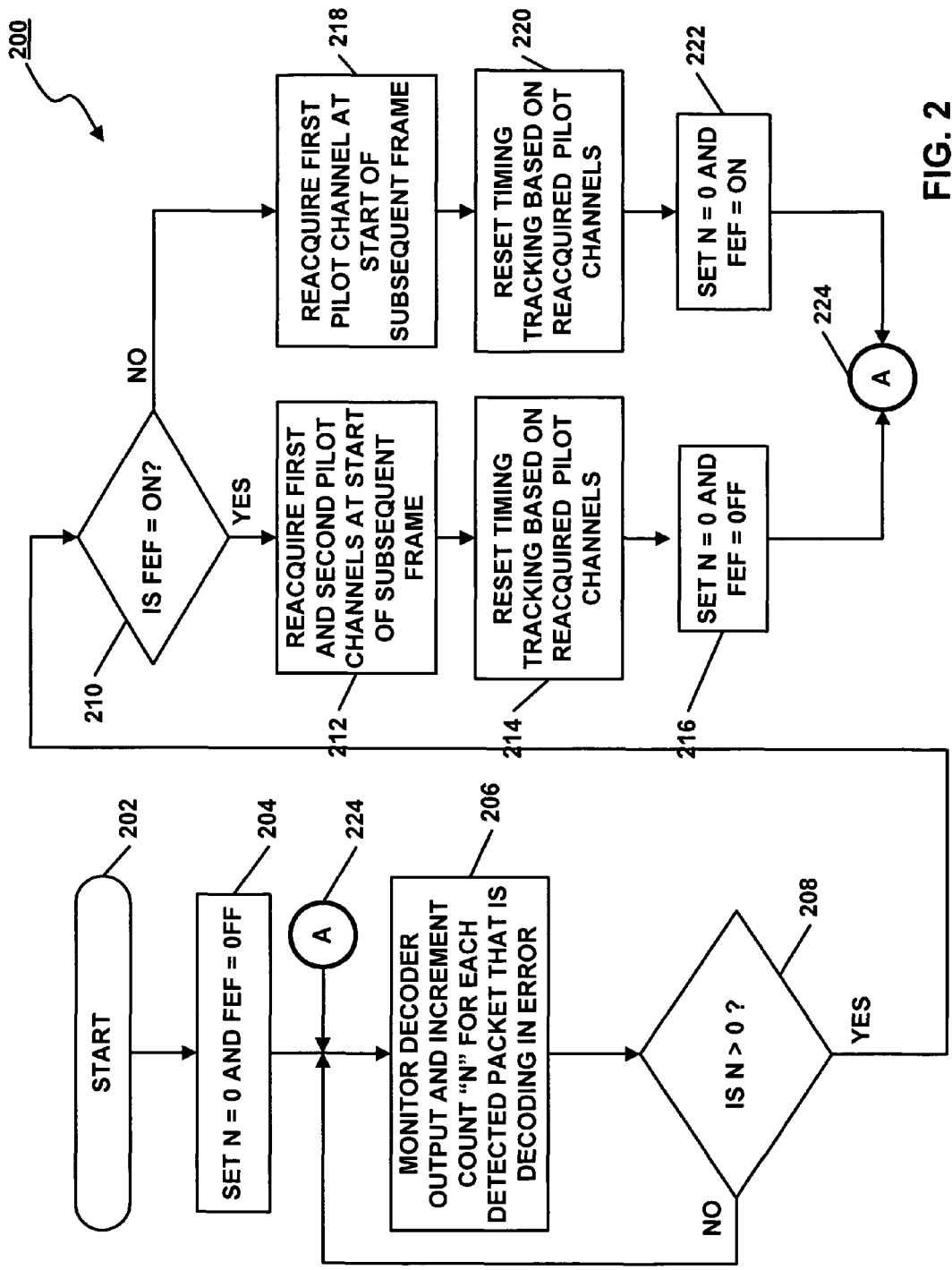
FIG. 2 is a flow diagram of another exemplary method for recovery of timing tracking that selectively utilizes at least two pilot channels according to the present disclosure.

FIG. 2 illustrates a method for recovery of timing tracking by selectively utilizing a second pilot channel. A first pilot channel is utilized when timing error is of a particular degree or occurrence, whereas two pilot channels are utilized when timing errors are of a greater degree or occurrence. An illustrated process 200 in FIG. 2 begins at start block 202. Flow then proceeds to block 204 where a count "N" is initialized to a value of zero and a repeated frame error flag (FEF) is set to "off." Flow then proceeds from block 204 to block 206 where the decoder output is monitored and the count N is incremented for each detected packet within a frame that is decoded in error. Flow then proceeds to decision block 208 where a determination is made whether the count N is greater than zero. If the count is not greater than zero, flow proceeds back to block 206 where the decoder output continues to be monitored.

Alternatively at block 208, if the count "N" is greater than zero, flow proceeds to decision block 210. At block 210, a determination is made whether or not the frame error flag has been set to "on," where the frame error flag (FEF) is set to "on" when more than one frame in a consecutive sequence (or, alternatively, more than one frame in a predetermined number of frame or period of time) encounters timing tracking problems, as will be described later. If, as determined in block 210, the FEF is set to "on," flow proceeds to block 212 where first and second pilot channels are reacquired at a start of a subsequent frame. The reason for reacquiring more than one pilot channel is because when the frame error flag is set to "on," this indicates a potentially more serious timing problem may exist. This is because timing errors have persisted over the course of at least two frames, thus indicating a more serious timing tracking problem and necessitating a greater degree of timing synchronization, accordingly.

After the process of block 212 is complete, flow proceeds to block 214 where timing tracking is reset based on the reacquired pilot channels. Flow then proceeds to block 216 where the counter "N" is reset to zero and the frame error flag is reset to "off."

Alternatively at block 210, if the frame error flag is "off," flow proceeds to block 218 where only a first pilot channel is reacquired at a start of a subsequent frame. Flow then proceeds to block 220 where timing tracking is reset based on the reacquired pilot channel. Next, flow proceeds to block 222 to where the count "N" is reset to a value of zero and the frame error flag is set to on. Flow proceeds then from block 222, as well as block 216 to block 224 labeled "A". This may be seen in FIG. 2, flow from block 224 continues to block 206 where the decoder output is once again monitored and the count incremented for each detected frame decoding error. It will be appreciated by those skilled in the art that greater numbers of pilot channels may be acquired based on the particular scheme of a respective communications system. Furthermore, it will be appreciated that although the method of FIG. 2 would only acquire at most first and second pilot channels for alternate frames (i.e., every other frame), a different periodicity could be set, such as every three or more repeated frames having detected frame decoding errors within.

Figure 3:
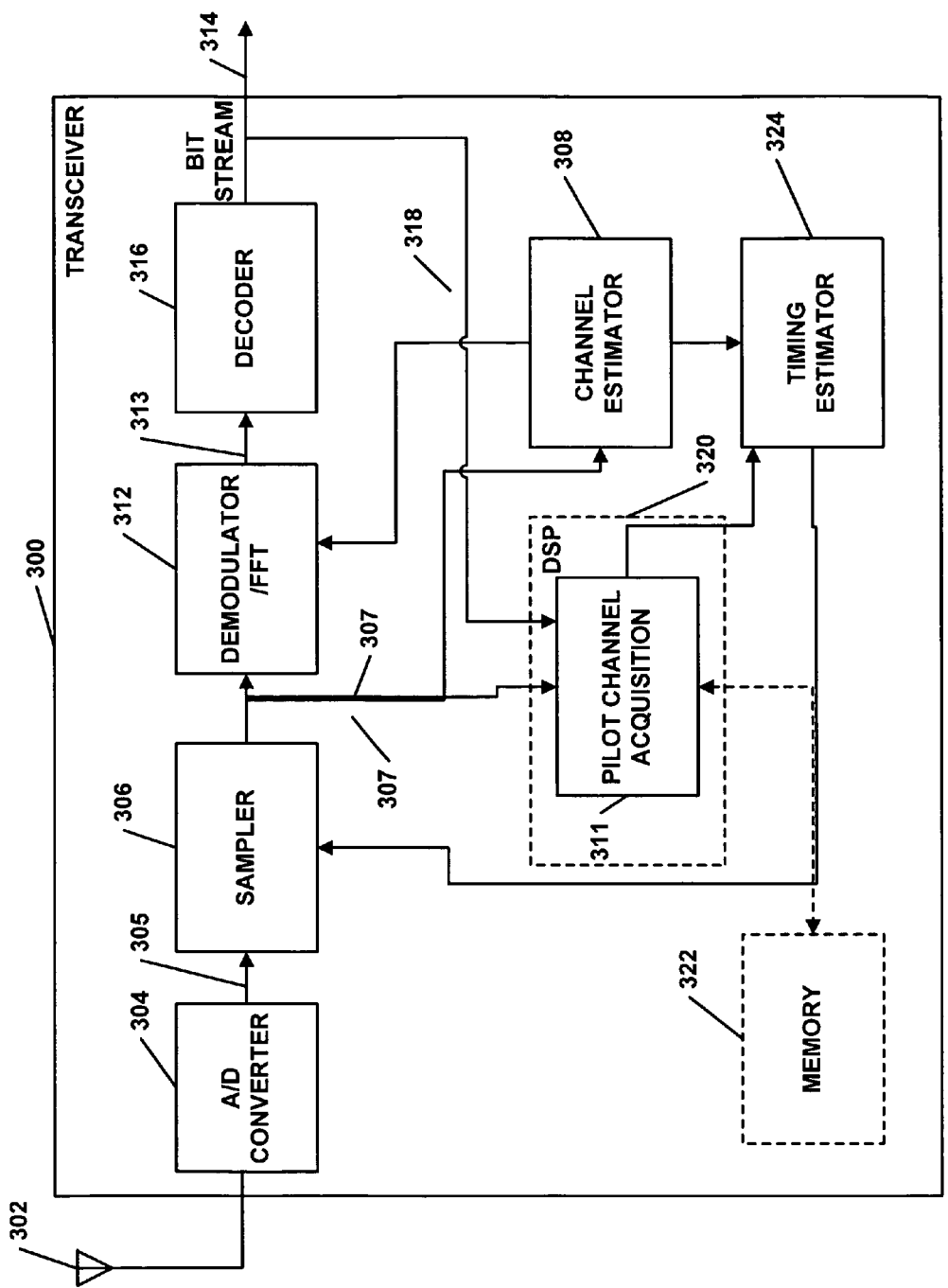
FIG. 3 is a block diagram of a transceiver employing an exemplary apparatus for resetting timing tracking according to the present disclosure.

FIG. 3 is a block diagram of an exemplary transceiver 300 that may employ apparatus to effect the above-described methodology for timing recovery. As illustrated, the transceiver 300 includes an antenna 302 to receive a transmitted wireless signal. The antenna 302 delivers the signal to an analog-to-digital (A/D) converter 304 that converts the analog wireless signal to a digital signal 305. A/D converter 304 outputs the digital signal 305 to a sampler 306 or similarly suitable device. Regardless, sampler 306 is the portion of the transceiver 300 that affects a timing window for sampling the subcarriers within the digital signal 305. Accordingly, sampler 306 is the portion of the transceiver 300 that utilizes the reset timing tracking information affected by the presently disclosed methods and apparatus. The output of the sampler 306, which is a synchronized digital signal 307, is input to a channel estimator 308, a demodulator/FFT 312, and a pilot channel acquisition module 311.

The channel estimator 308 performs descrambling and transformation using the frequency domain pilot tones or, the time division multiplexed pilot channels inserted by the transmitter (not shown) into the digital signal. The pilot channel acquisition module 311 utilizes the time division multiplexed (TDM) pilot channels to determine the actual timing tracking during initialization of the transceiver 300 and, according to the presently disclosed methods and apparatus, reacquisition of pilot channels when decoding errors are detected. Additionally, the pilot channel acquisition module 311 monitors a mid-stream output 314, which is output by a decoder 316 via a communication connection 318, for example. It is also noted that the pilot channel acquisition module 311 may effect the methods illustrated in FIGS. 1 and 2. Furthermore, the pilot channel acquisition module 311 may be implemented as a separate processor or as par of a larger digital signal processor 320 illustrated with dashed lines. Additionally, the instructions used by the pilot channel acquisition module 311 or, alternately, DSP 320, to execute the methods shown in FIGS. 1 and 2, as examples, may be stored in a memory device 322.

The timing tracking information determined by pilot channel acquisition module 311 and the channel estimation determined by channel estimator 308 are sent to a timing estimator 324, which utilizes this information to set the actual timing window for sampler 306.

As also shown in FIG. 3, the modulator/FFT 312 sends a demodulated signal 326 to the decoder 316. After the demodulated signal 326 is received by decoder 316, the decoder decodes the information and outputs the resultant serial bitstream 314 for use by the mobile communication device in which the transceiver is housed, such as a mobile phone device or a personal data assistant, as examples.

Figure 4:
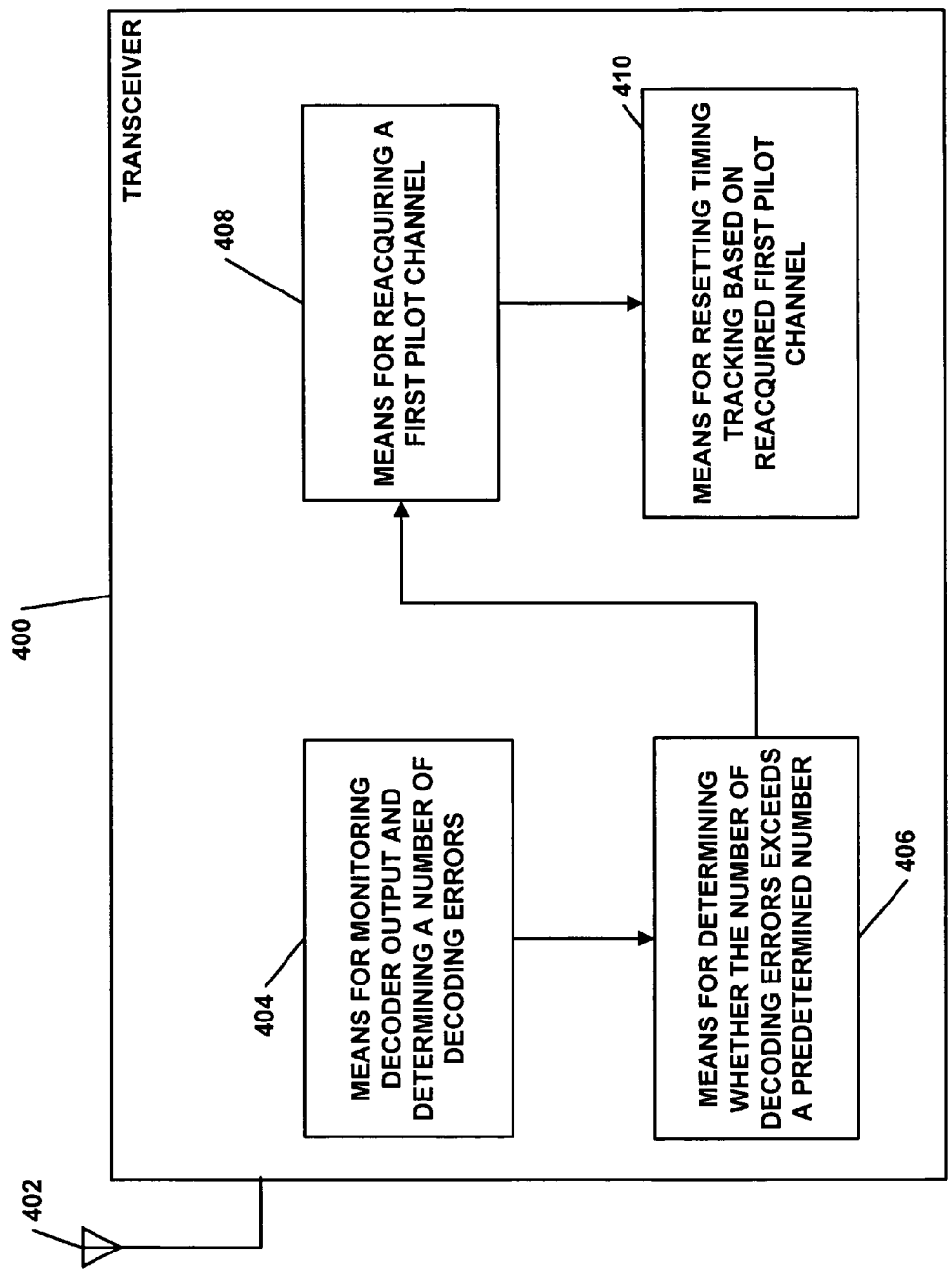
FIG. 4 is a block diagram of another exemplary transceiver including an apparatus for timing recovery according to the present disclosure.

FIG. 4 illustrates another example of an apparatus that utilizes or provides timing tracking recovery according to the present disclosure. As illustrated, a transceiver 400, which includes the exemplary apparatus, includes an antenna 402 for receiving a wireless communications signal. Within the transceiver 400 is included an apparatus for effecting timing tracking recovery. This apparatus includes means 400 for monitoring decoder output and determining a number of packets decoding errors. Alternatively, rather than determining a number of decoding errors, means 400 may simply determine whether at least one error has occurred. Means 400 delivers the count (or error determination) to a means for determining whether the number of errors exceeds a predetermined number 406 (or whether an error has occurred). As illustrated in the previous examples of FIGS. 1 and 2, the predetermined number may be zero or may, alternatively, be a number other than zero, which is a threshold amount that must be exceeded before reacquisition of a pilot channel is performed.

When means 406 determines that the count N exceeds the predetermined number, this determination is communicated by means 406 to a means for requiring a first pilot channel 408. Once means 408 reacquires the pilot channel, the pilot channel information is passed from means 408 to a means for resetting timing tracking based on the first pilot channel 410.

Figure 5:
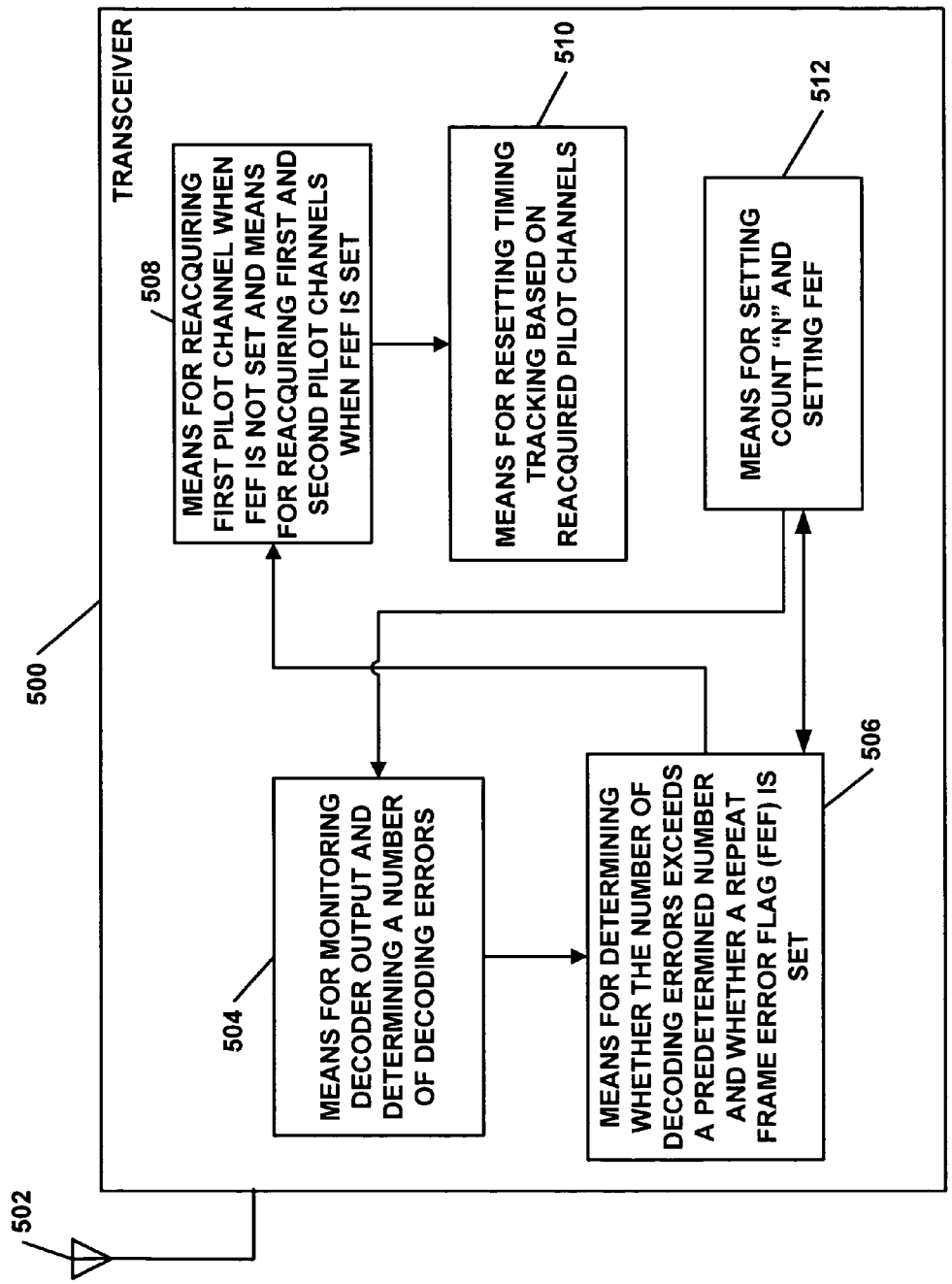
FIG. 5 is a block diagram of yet another exemplary transceiver apparatus including an apparatus for timing recovery according to the present disclosure.

FIG. 5 illustrates yet another example of an apparatus for effecting timing tracking recovery. In particular, the apparatus of FIG. 5 effects timing recovery by using methodology similar to the method illustrated in FIG. 2, as a specific example. As illustrated FIG. 5 includes a transceiver 500 having an antenna 502 for receiving wireless communications signals. Within the transceiver 500 is an apparatus for timing recovery including means 504 for monitoring decoder output and determining a number of decoding errors. The determined number is passed by means 504 to means 506 for determining whether the number of decoding errors exceeds a predetermined number and whether a repeat frame error flag (FEF) is set. The frame error flag, similar to the method of FIG. 2, is set when decoding errors occur during a subsequent frame after a previous frame also having decoding errors (i.e., repeating errors).

Means 506 is configured to then send or signal a means 508 for reacquiring a first pilot channel when the frame error flag is not set and reacquiring first and second pilot channels when the frame error flag is set. In turn, means 508 outputs either the first reacquired pilot channel or the first and second reacquired pilot channels to means 510, the output dependent on the determination of the state of the frame error flag to means 510. Means 510 is configured to reset timing tracking based on the reacquired pilot channel or channels.

The apparatus within receiver 500 also includes means 512 for resetting the error number determination, such as resetting the number to zero when the timing tracking has been reset. Means 512 also is for setting the frame error flag to either "on" or "off" dependent on whether or not subsequent frames have encountered error. Means 512 may, for example, trigger or signal means 504 and means 506, which respectively count the errors and make determinations based on the count and frame error flag.

It is noted that the apparatus of FIGS. 4 and 5 may be implemented by the pilot channel acquisition module 311 shown in FIG. 3 as one example or, by some other processor within a transceiver such as digital signal processor 320, also illustrated in FIG. 3.

The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

What is claimed is:

1. A method for recovery of timing of a communication signal in a transceiver comprising:
   acquiring a first pilot channel to establish timing tracking of the transceiver;
   monitoring a decoded signal in the transceiver for decoding errors occurring during a first frame;
   determining a number of decoding errors in the first frame of the decoded signal;
   determining whether the number of decoding errors is greater than a predetermined non-zero amount;
   reacquiring the first pilot channel at a start of a second received frame when the number of decoding errors is determined to be greater than the predetermined amount; and
   resetting timing tracking of the transceiver based on the reacquired first pilot channel.

2. The method as defined in claim 1, wherein the frame is a superframe containing a plurality of smaller frames.

3. The method as defined in claim 1, wherein the method is used for timing recovery for orthogonal frequency division multiplexed signals.

4. The method as defined in claim 1, further comprising:
   determining whether decoding errors have occurred during decoding of at least the first and the second frame; and
   reacquiring the first pilot channel and a second pilot channel at a start of a third frame received subsequent to determining that the second frame has a decoding error.

5. The method as defined in claim 4, further comprising:
   resetting timing tracking of the transceiver based on the reacquired first and second pilot channels when the determination has been made that decoding errors have occurred during decoding of the at least first and second frames; and
   resetting timing tracking of the transceiver based on the reacquired first pilot channel when decoding errors have occurred during decoding of only the first frame.

6. The method as defined in claim 4, wherein the first and second frames are consecutive frames.

7. A computer readable medium having instructions stored thereon, the stored instructions, when executed by a processor, cause the processor to perform a method to recover timing tracking in a transceiver, the method comprising:
   acquiring a first pilot channel to establish timing tracking of the transceiver;
   monitoring a decoded signal in the transceiver for decoding errors occurring during a first frame;
   determine a number of decoding errors in the first frame of the decoded signal;
   determining whether the number of decoding errors is greater than a predetermined non-zero amount;
   reacquiring the first pilot channel at a start of a second received frame when the number of decoding errors is determined to be greater than the predetermined amount; and
   resetting timing tracking of the transceiver based on the reacquired first pilot channel.

8. The computer readable medium as defined in claim 7, wherein the frame is a superframe containing a plurality of smaller frames.

9. The computer readable medium as defined in claim 7, wherein the method is used for timing recovery for orthogonal frequency division multiplexed signals.

10. The computer readable medium as defined in claim 7, wherein the method further comprises:
    determining whether decoding errors have occurred during decoding of at least the first and the second frame; and
    reacquiring the first pilot channel and a second pilot channel at a start of a third frame received subsequent to determining that the second frame has a decoding error.

11. The computer readable medium as defined in claim 10, wherein the method further comprises:
    resetting timing tracking of the transceiver based on the reacquired first and second pilot channels when the determination has been made that decoding errors have occurred during decoding of the at least first and second frames; and
    resetting timing tracking of the transceiver based on the reacquired first pilot channel when decoding errors have occurred during decoding of only the first frame.

12. The computer readable medium as defined in claim 10, wherein the first and second frames are consecutive frames.

13. A transceiver apparatus configured to recover timing tracking comprising:
    a decoder configured to decode communication signals received by transceiver including at least one pilot channel; and
    at least one processor configured to:
       acquire a first pilot channel to establish timing tracking of the transceiver;
       monitor a decoded signal output by the decoder for decoding errors occurring during a first frame;
       determine a number of decoding errors in the first frame of the decoded signal;
       determine whether the number of decoding errors is greater than a predetermined non-zero amount;
       reacquire the first pilot channel at a start of a second received frame when the number of decoding errors is determined to be greater than the predetermined amount; and
       reset timing tracking of the transceiver based on the reacquired first pilot channel.

14. The transceiver as defined in claim 13, wherein the frame is a superframe containing a plurality of smaller frames.

15. The transceiver as defined in claim 13, wherein the transceiver is used in an orthogonal frequency division multiplexed system.

16. The transceiver as defined in claim 13, wherein the at least one processor is further configured to:
    determine whether decoding errors have occurred during decoding of at least the first and the second frame; and
    reacquire the first pilot channel and a second pilot channel at a start of a frame received subsequent to determining that the second frame has a decoding error.

17. The transceiver as defined in claim 16, wherein the at least one processor is further configured to:
    reset timing tracking of the transceiver based on the reacquired first and second pilot channels when the determination has been made that decoding errors have occurred during decoding of the at least first and second frames; and
    reset timing tracking of the transceiver based on the reacquired first pilot channel when decoding errors have occurred during decoding of only the first frame.

18. The transceiver as defined in claim 16, wherein the first and second frames are consecutive frames.

19. An apparatus for resolving timing in a wireless communication device comprising:
    means for acquiring a first pilot channel to establish timing tracking of a transceiver;
    means for monitoring a decoded signal in the transceiver for decoding errors occurring during a first frame;

means for determining a number of decoding errors in the first frame of the decoded signal;

means for determining whether the number of decoding errors exceeds a predetermined non-zero number;

means for reacquiring the first pilot channel at a start of a second received frame when the number of decoding errors is determined to be greater than the predetermined amount;

means for resetting timing tracking of the transceiver based on reacquired first pilot channel.

20. The apparatus as defined in claim 19, wherein the frame is a superframe containing a plurality of smaller frames.

21. The apparatus as defined in claim 19, wherein the wireless communication device is used in a wireless orthogonal frequency division multiplexed system.

22. The apparatus as defined in claim 19, wherein the apparatus further comprises:

means for determining whether decoding errors have occurred during decoding of at least one of the first frame and a second frame; and means for reacquiring the first pilot channel and a second pilot channel at a start of a frame received subsequent to determining that the second frame has a decoding error.

23. The apparatus as defined in claim 22, wherein the means for determining whether the number of decoding errors exceeds a predetermined number further comprises:

means for determining whether a frame error flag has been set, which indicates whether decoding errors have occurred during decoding of at least the first and the second frame.

24. The apparatus as defined in claim 23, comprising:

means for reacquiring the second pilot channel at a start of a frame received subsequent to a determination by the means for determining whether a frame error flag has been set, which indicates whether decoding errors have occurred during decoding of at least the first and the second frame has determined that the second frame has a decoding error.

25. The apparatus as defined in claim 23, wherein the means for resetting timing tracking based on reacquired first pilot channel is further configured for resetting timing tracking of the wireless communication device based on the reacquired first pilot channel when the frame error flag is not set and resetting timing tracking of the wireless communication device based on the reacquired first pilot channel when the frame error flag is set.

26. The apparatus as defined in claim 23, wherein the first and second frames are consecutive frames.

* * * * *